(12) United States Patent
Visser

(10) Patent No.: US 7,067,102 B1
(45) Date of Patent: Jun. 27, 2006

(54) METHOD AND APPARATUS FOR PRODUCING OZONE

(75) Inventor: Barend Visser, Potchefstroom (ZA)

(73) Assignee: Potchefstroom University for Christian Higher Education (ZA)

( * ) Notice: Subject to any disclaimer, the term of this patent is extended or adjusted under 35 U.S.C. 154(b) by 0 days.

(21) Appl. No.: 09/914,199

(22) PCT Filed: Feb. 24, 2000

(86) PCT No.: PCT/ZA00/00031

§ 371 (c)(1),
(2), (4) Date: Mar. 5, 2002

(87) PCT Pub. No.: WO00/50338

PCT Pub. Date: Aug. 31, 2000

(30) Foreign Application Priority Data

| Feb. 24, 1999 | (ZA) | 99/1479 |
| Jan. 21, 2000 | (ZA) | 00/0259 |
| Feb. 23, 2000 | (ZA) | 00/0887 |

(51) Int. Cl.
*C01B 13/10* (2006.01)
*B01J 19/08* (2006.01)

(52) U.S. Cl. ............... 423/581; 204/176; 422/186.07; 422/186.16; 422/186.18

(58) Field of Classification Search ............... 204/176; 422/186.07, 186.16, 186.18; 423/581
See application file for complete search history.

(56) References Cited

U.S. PATENT DOCUMENTS

| 3,883,413 | A | * | 5/1975 | Douglas-Hamilton | ....... 204/176 |
| 4,038,165 | A | * | 7/1977 | Lowther | ..................... 204/176 |
| RE30,320 | E | * | 7/1980 | Lowther | ..................... 204/176 |
| 4,713,220 | A | * | 12/1987 | Huynh et al. | .......... 422/186.16 |
| 4,869,881 | A | * | 9/1989 | Collins | ................. 422/186.18 |

FOREIGN PATENT DOCUMENTS

| DE | 19633368 A | * | 2/1998 |
| JP | 09156904 A | * | 6/1997 |
| SU | 941 276 B | * | 7/1982 |

* cited by examiner

*Primary Examiner*—Stanley S. Silverman
*Assistant Examiner*—Maribel Medina
(74) *Attorney, Agent, or Firm*—Cantor Colburn LLP

(57) ABSTRACT

A method of producing ozone comprises the steps of generating intermittent bursts of corona discharge in an electrode region 20.2, and passing oxygen-containing fluid through the region, thereby to cause ionization of the oxygen. The electrode is energized by a train of voltage pulses. Each pulse has a rise time of better than 2 kV/100 ns.

15 Claims, 9 Drawing Sheets

METHOD AND APPARATUS FOR PRODUCING OZONE

TECHNICAL FIELD

This invention relates to a method and apparatus for producing ozone.

BACKGROUND ART

A known method for producing ozone includes the steps of passing oxygen at 1 atmosphere and 25° C. through concentric metallised glass tubes to which low-frequency power at 50–500 Hz and 10–20 kV is applied. Due to the relatively slow change in potential (5 kV per millisecond), a corona or silent electric discharge is maintained between the electrodes. A disadvantage of this method is that energy is lost in the form of heat, and a relatively low yield ratio of ozone is achieved.

OBJECTIVE OF THE INVENTION

It is accordingly an object of the present invention to provide a method and apparatus for producing ozone with which the aforesaid disadvantage may be overcome or to provide a useful alternative to the known method.

SUMMARY OF THE INVENTION

According to the invention there is provided a method of producing ozone comprising the steps of generating intermittent bursts of corona discharge in an electrode region, and passing oxygen-containing fluid through the region, thereby to cause ionization of the oxygen.

The intermittent bursts may be generated by generating a changing electric field in the region by energising the electrode with intermittent voltage pulses having a slope of at least 2 kV/100 ns, the field having a peak value of at least 2 kV per millimeter. In this specification, the word "slope" is used to denote the slope between 30% and 70% of the peak to peak value of the pulse.

Preferably, the peak value is at least 3 kV per millimeter and the slope is in the order of 3 kV/10 ns.

Each voltage pulse preferably has a pulse width of less than 100 ns.

The bursts may be discrete bursts.

The invention also includes within its scope apparatus for producing ozone comprising:
 a housing defining a passage for a fluid comprising oxygen;
 an electrode disposed adjacent the passage; and
 pulse generating means connected to the electrode,
 the pulse generating means being operative to generate a changing electric field by generating a train of voltage pulses each having a slope of at least 20 kV/100 ns.

The electric field has a peak value of at least 3 kV per millimeter. Each voltage pulse preferably has a pulse width of less than 100 ns.

The pulse generating means may comprise a self-oscillating circuit.

The self-oscillating circuit may comprise a field effect transistor (FET) and a switch circuit therefor, the switch circuit comprising charge storage means; switching means connected between the charge storage means and a gate of the FET; the switching means being operative to deposit charge from the storage means onto the gate, thereby to improve a rise time of a signal in a drain-source circuit of the FET.

The charge storage means may comprise a capacitor and the switch means may comprise a SIDAC.

The electrode may be connected to a secondary winding of a transformer, a primary winding of the transformer being connected in the drain-source circuit of the FET.

The passage may extend between an inlet to the housing and an outlet therefrom.

The electrode may be an annular electrode disposed in the housing and the passage may extend through a clearance defined between the electrode and an annular ridge in the housing.

The housing may be a metal housing, the housing may be connected to the secondary winding of the transformer and an insulating carrier for the electrode may be mounted on shoulder formations in the housing.

In another embodiment the housing may be of an electricity insulating material, the electrode may be disposed circumferentially on the outside of the housing and a second electrode also connected to the secondary winding may be provided spaced from an inner wall of the housing, to define the passage between the second electrode and the inner wall.

BRIEF DESCRIPTION OF THE DRAWINGS

The invention will now be described further, by way of example only, with reference to the accompanying drawings wherein.

DESCRIPTION OF A PREFERRED EMBODIMENT OF THE INVENTION

Figure 1:
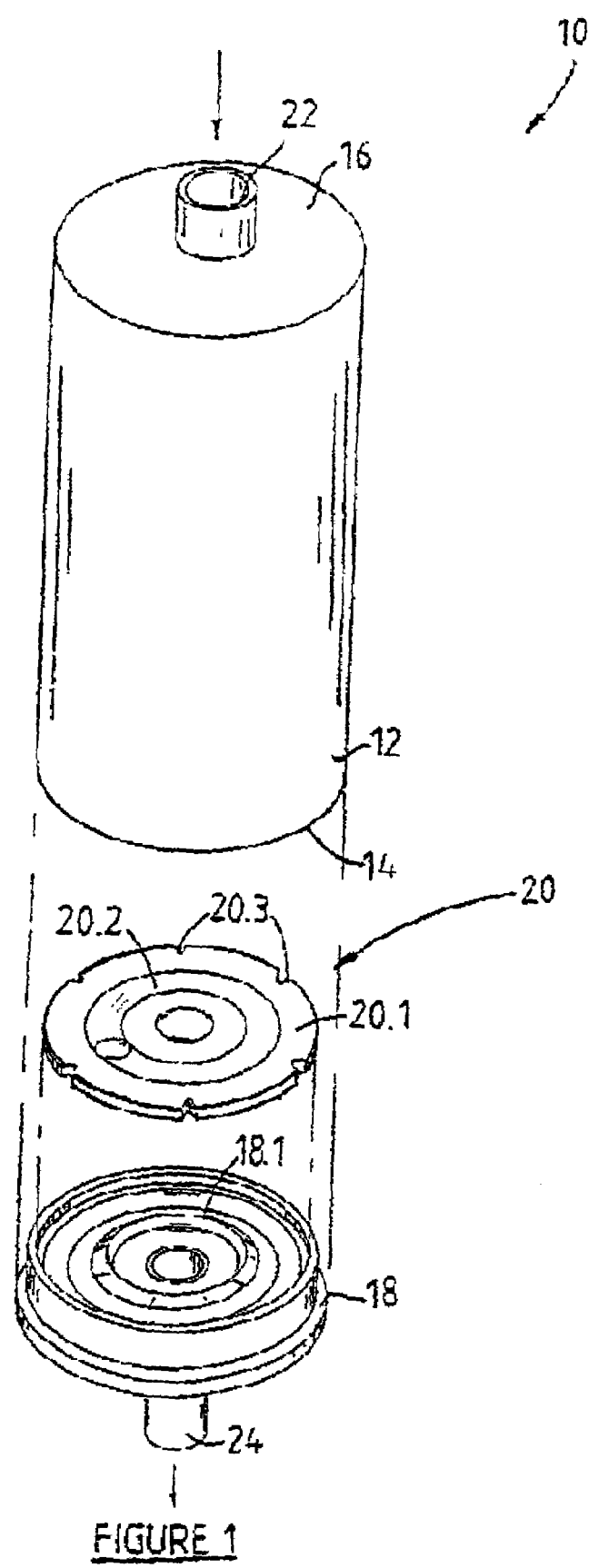
FIG. 1 is an exploded perspective view of apparatus according to a first embodiment of the invention for producing ozone.
Figure 2:
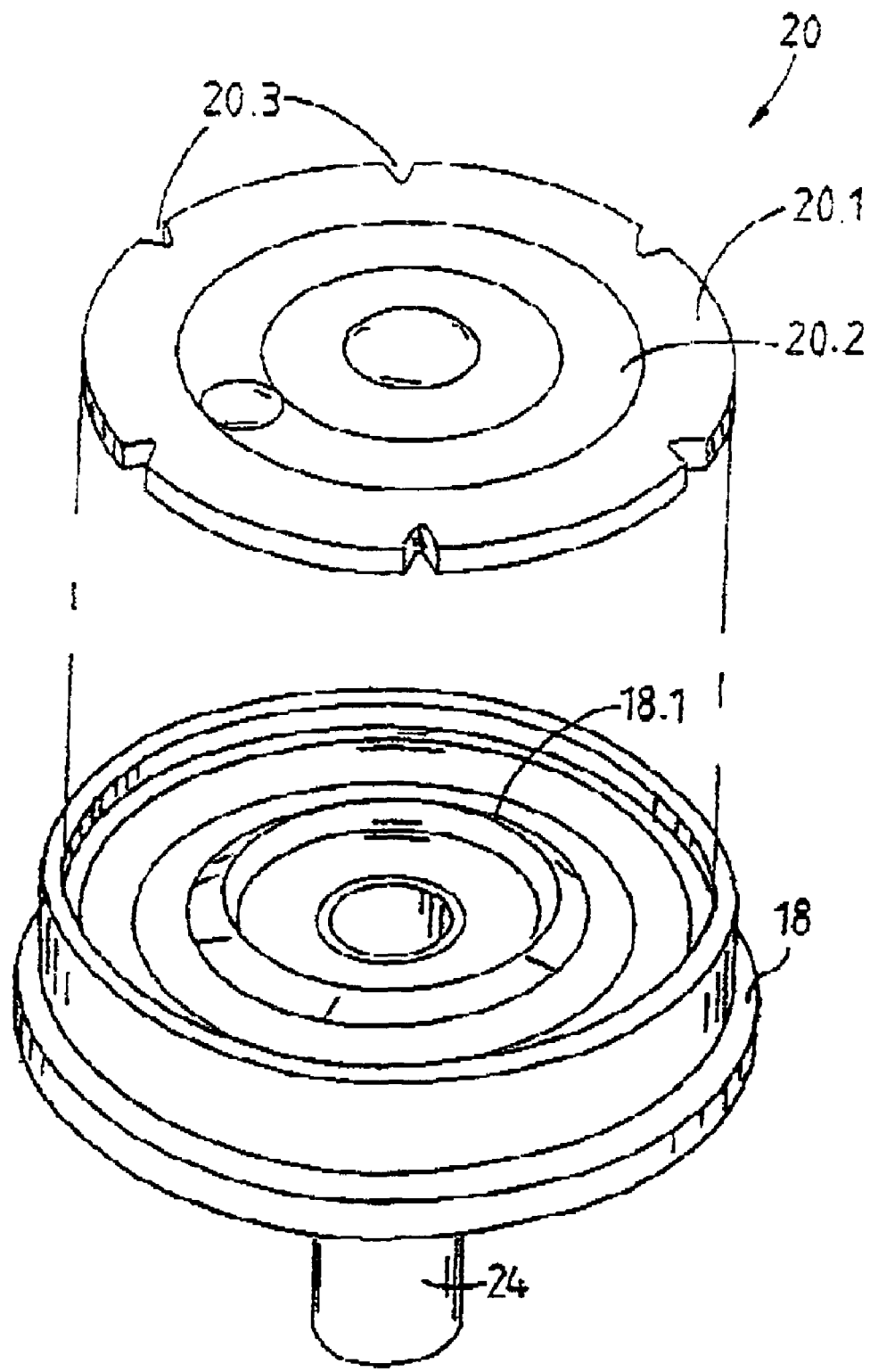
FIG. 2 is an exploded perspective view of a closure and electrode assembly of the apparatus of FIG. 1.
Figure 3:
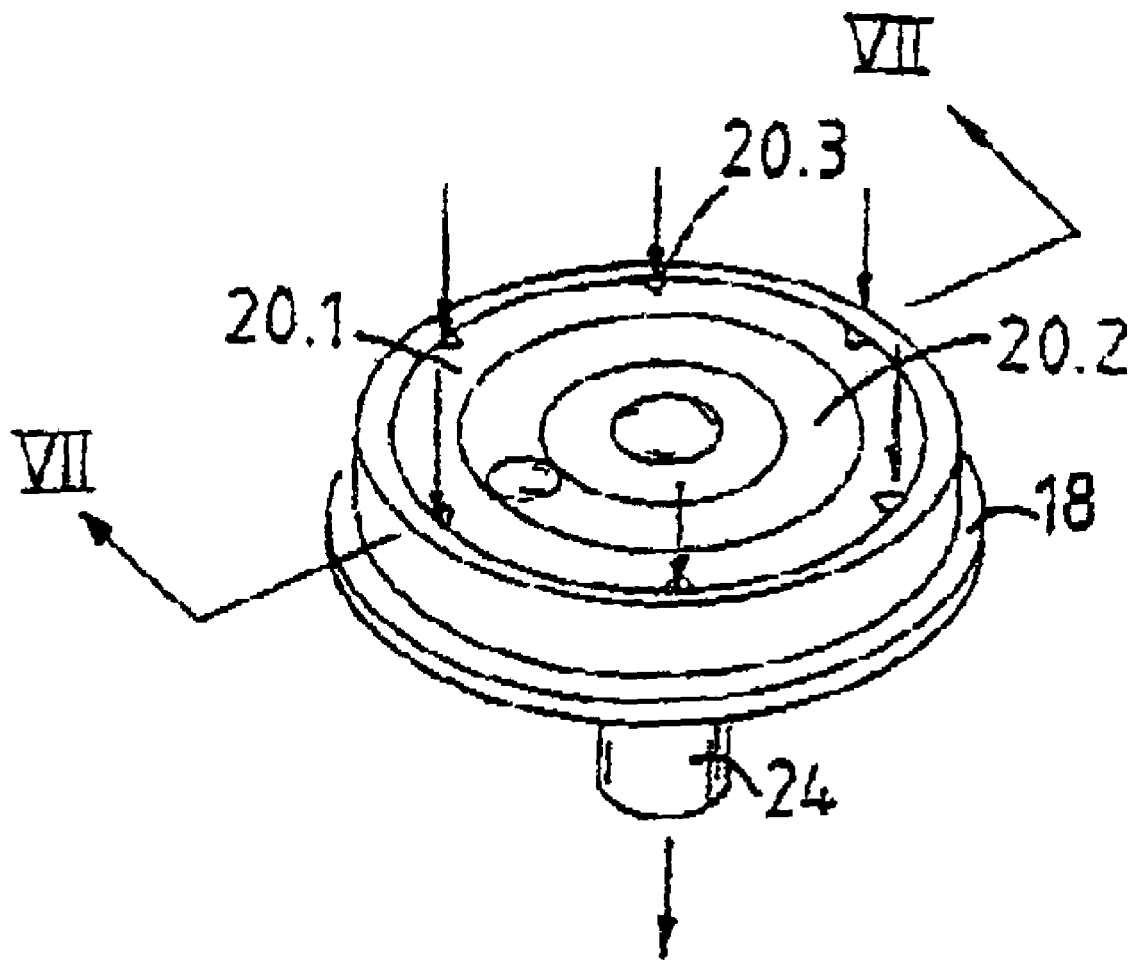
FIG. 3 is a perspective view of the closure and electrode assembly of FIG. 2 when assembled.

Referring to FIG. 1, apparatus according to a first embodiment of the invention for producing ozone, is generally designated by reference numeral 10.

The apparatus 10 includes a tubular anodised aluminum housing 12 having an open end 14 and a close end 16, and a separate closure 18 for closing the open end. The apparatus 10 further includes an electrode assembly 20 mountable on the closure 18 and pulse generating means in the form of an electronic circuit 30 (shown in FIG. 4) for energising the electrode assembly 20.

An inlet 22 to the housing is provided in the closed end 16 and an outlet 24 is defined in the closure 18. A passage 21 (shown in FIG. 7) extends from the inlet 22 to the outlet 24.

Figure 7:
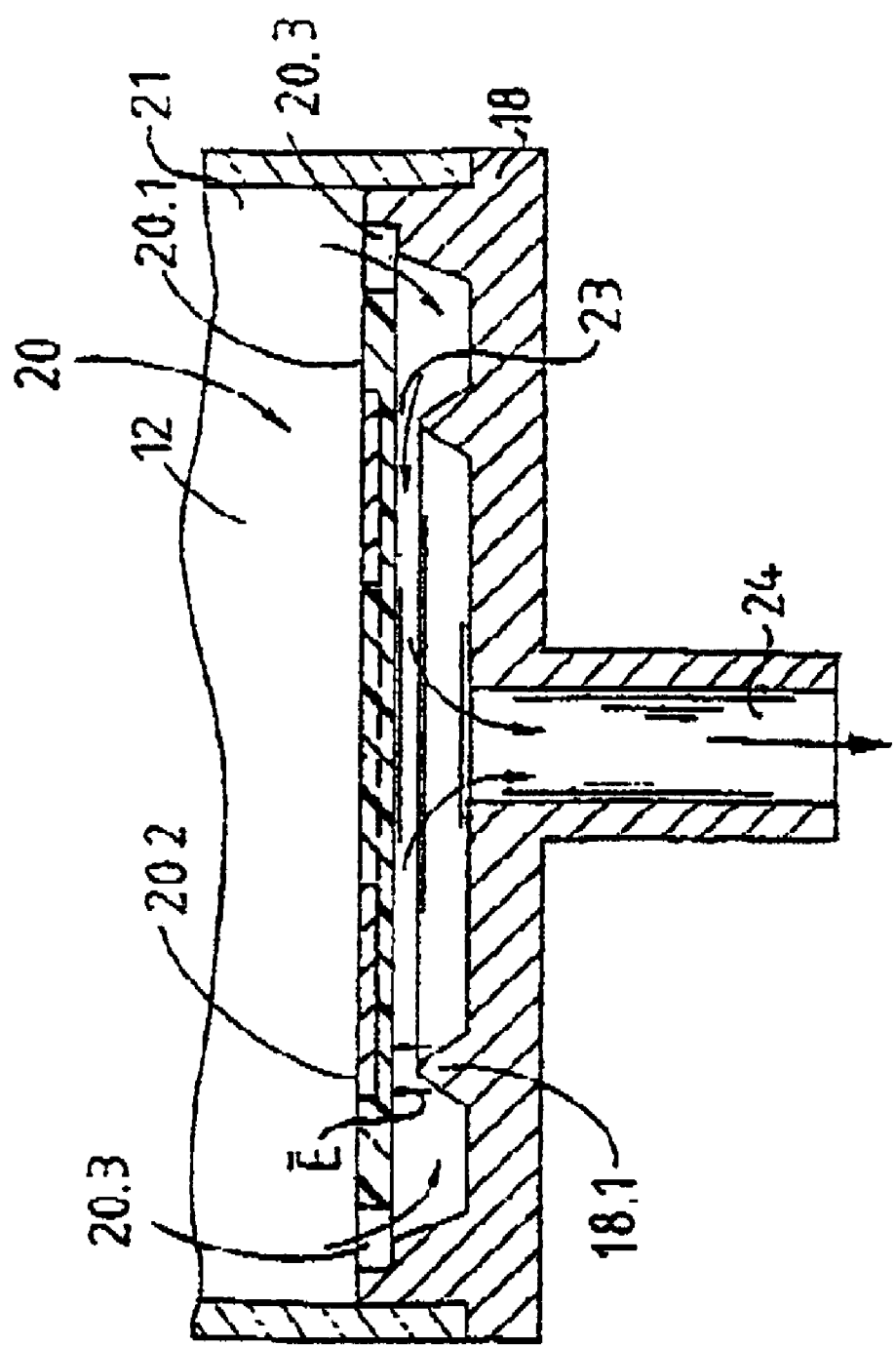
FIG. 7 is a cross-sectional view on line VII in FIG. 3.

As best shown in FIGS. 1 and 7, the electrode assembly 20 comprises an insulating disc or base 20.1 of an ozone and corona resistant material, such as glass, alumina etc and an annular electrode 20.2 mounted on the face of the base 20.1 facing away from the closure 18. The base 20.1 is provided with a plurality of spaced peripheral notches 20.3, the purpose of which will be described hereinafter.

The closure 18 is provided with an annular ridge formation 18.1. As best shown in FIG. 7, when the electrode assembly 20 is mounted on shoulder formations on the closure 18, the ridge formation 18.1 is disposed in close proximity, but with a clearance 23 of approximately 0.3 mm from the base 20.1.

The aforementioned passage 21 extends from the inlet 22 along the tubular housing 12, through the notches 20.3 in the base, through the clearance 23 between the ridge formation 18.1 and the base 20.1 and out via the outlet 24.

As will be described hereinafter, a rapidly changing electrode field is established in the passage 21 in the region of the ridge formation 18.1 causing a corona discharge and oxygen flowing along the passage 21 in use, therefore passes through the field. The effect of the electric field is that instantaneous ionisation of oxygen is achieved by the corona discharge to produce ozone from the oxygen, without substantial energy loss in the form of heat generated.

Figure 5A:
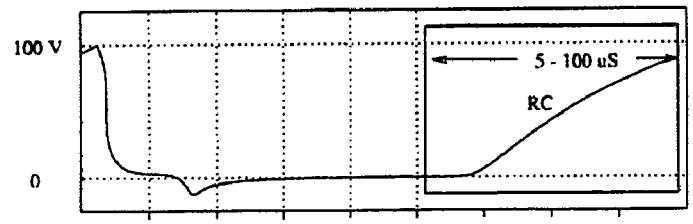
FIGS. 5(a);(b);(c); and (d) are voltage waveforms against a first time scale at points a, b, c and d in FIG. 4.
Figure 5B:
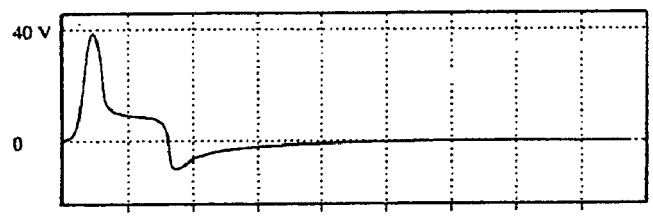
Figure 5C:
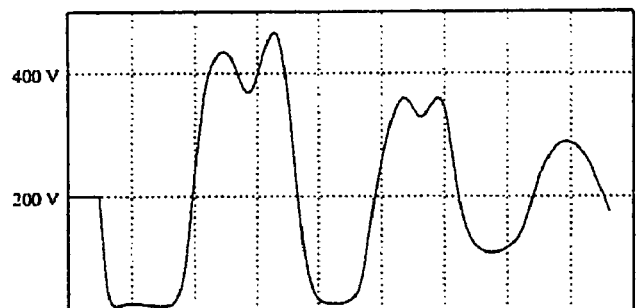
Figure 5D:
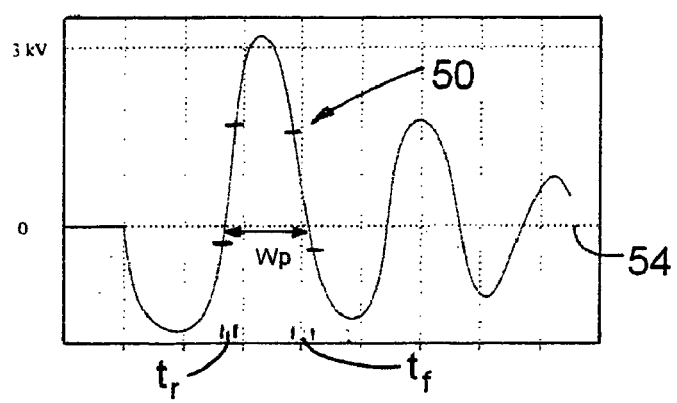
Figure 6A:
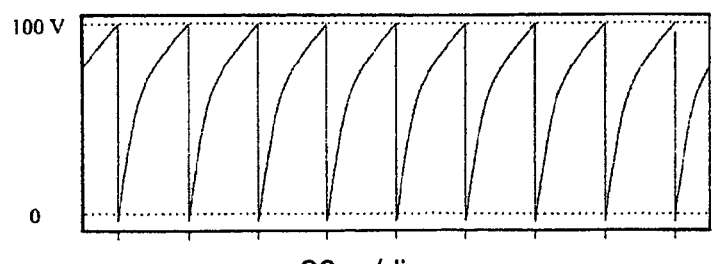
FIGS. 6(a);(b);(c); and (d) are the same wave forms against a larger time scale.
Figure 6B:
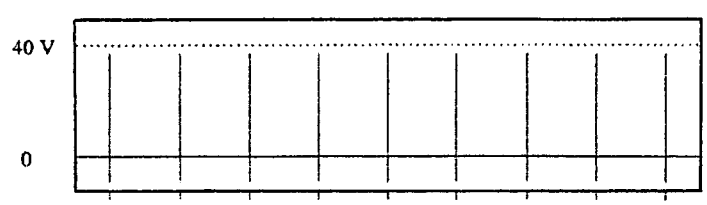
Figure 6C:
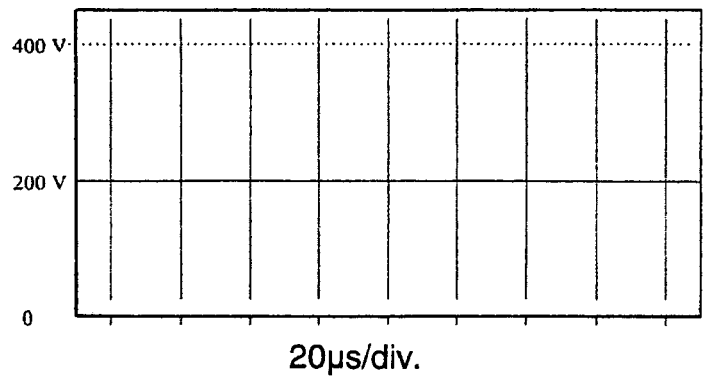
Figure 6D:
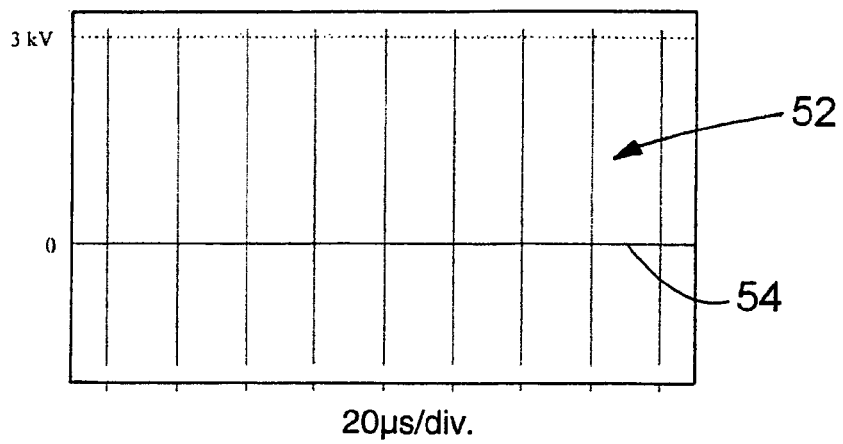

The applicant has found that the ozone yield ratio is dependent on the rise time $t_r$, the fall time $t_f$ and width $w_p$ of the pulses 50 (shown in FIG. 5(d)) in the train 52 of pulses (shown in FIG. 6(d)) applied to the electrode assembly 20. It is believed that the shorter the rise and fall times and/or the pulse width, the more efficient the apparatus becomes.

Figure 4:
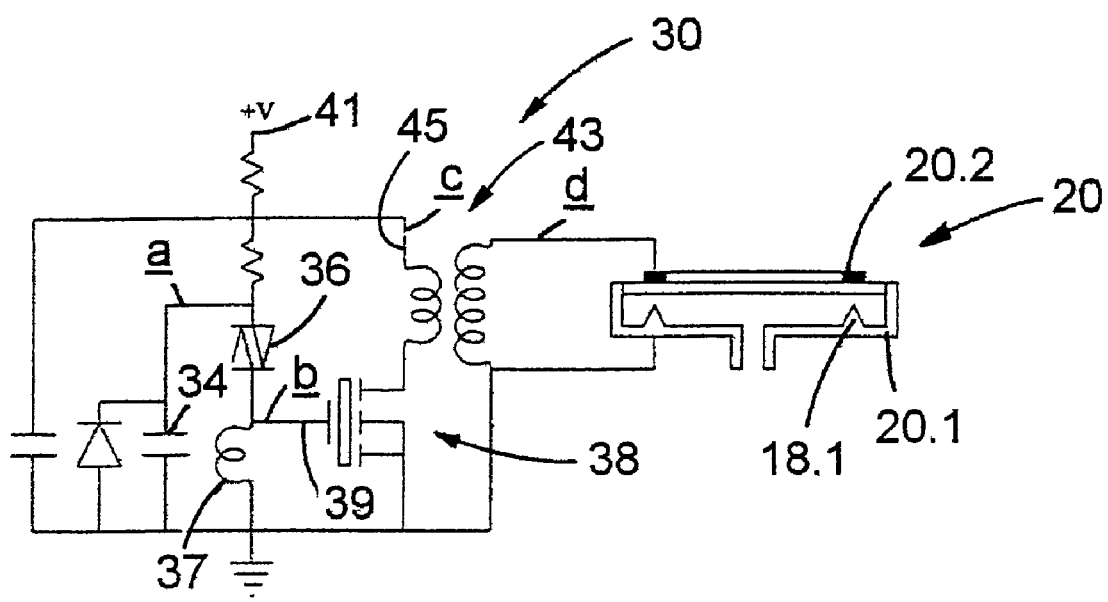
FIG. 4 is a schematic representation of an electronic circuit used to generate a train of voltage pulses that is applied to the electrode assembly of FIGS. 2 and 3.

A self-oscillating circuit 30 for energizing the electrode assembly 20 is shown in FIG. 4. Voltage waveforms as measured at points a, b, c and d are shown in FIGS. 5(a), (b), (c) and (d) respectively and also in FIGS. 6(a), (b), (c) and (d) respectively.

The circuit 30 comprises a capacitor 34 in parallel with a SIDAC 36 and inductor 37. The SIDAC is connected to the gate 39 of a field effect transistor (FET) such as a MOSFET 38 of the type IRF 740, for example. The SIDAC 36 conducts current when a voltage exceeding a certain threshold (100V for example) is applied across it. A primary winding of a transformer 43 is connected in the drain-source circuit 45 of the MOSFET 38. The secondary winding of the transformer is connected to the electrode assembly 20 as shown in FIG. 4.

A DC voltage of about 150V is applied at point 41 of the circuit. Initially the potential difference across the SIDAC 36 is insufficient to cause the SIDAC 36 to switch on and hence the capacitor 34 is charged up. When the voltage over the SIDAC 36 exceeds the aforementioned threshold voltage of the SIDAC 36, it switches on, resulting in a closed circuit from the capacitor 34 to the gate 39 of the MOSFET 38, partially discharging the capacitor 34 and hence charging the gate 39. The result is that a charge will now be shared between the capacitor 34 and the gate 39, so that some voltage, preferably sufficiently above the gate threshold voltage (typically 6V) relative to ground, is applied to the gate. The current that discharges from the capacitor 34 through to SIDAC 36 is applied to the gate 39 of the MOSFET 38 slightly prior to the onset of current flow in the drain-source circuit 45. As a result of the current from the capacitor, the voltage on the gate exceeds the aforementioned threshold voltage by a sufficient amount. The resulting signals at points a, b, c and d are shown in FIGS. 5(a) to (d) respectively and in FIGS. 6(a) to (d), respectively.

Using this method, the gate voltage may for short intervals be driven approximately two to four times beyond the maximum threshold voltage rating of some MOSFETs without destroying the device.

As will be seen from FIGS. 5(d) and 6(d) each of the pulses 50 in the train 52 of voltage pulses applied to the electrode assembly has a 30%–70% slope or rise time t, and a fill time $t_f$ of better than 2 kV/100 ns, preferably in the order of 3 kV/10 ns. Furthermore, the width of the pulses $w_n$ as they pass through the average value 54 is shorter than 100 ns, preferably shorter than 30 ns.

The peak value of the voltage applied to the electrode assembly is in the order of 3 kV and with the clearance between the electrode 20.2 and the ridge 18.1 in the order of 0.3 mm, the maximum electric field strength E is bigger than 3 kV/mm, preferably in the order of 10 kv/mm.

Figure 8:
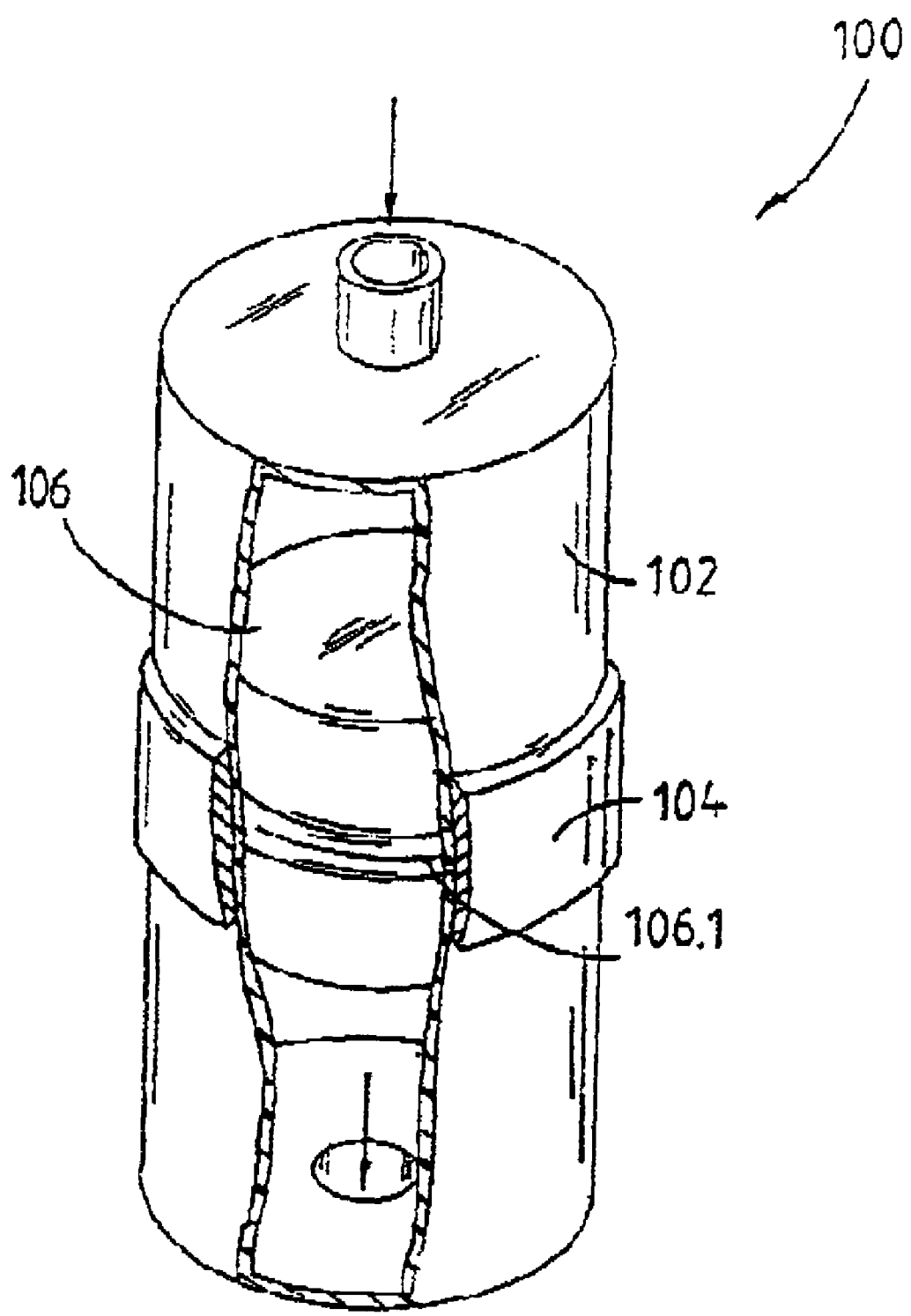
FIG. 8 is a partially broken away perspective view of apparatus according to a second embodiment of the invention for producing ozone.
Figure 9:
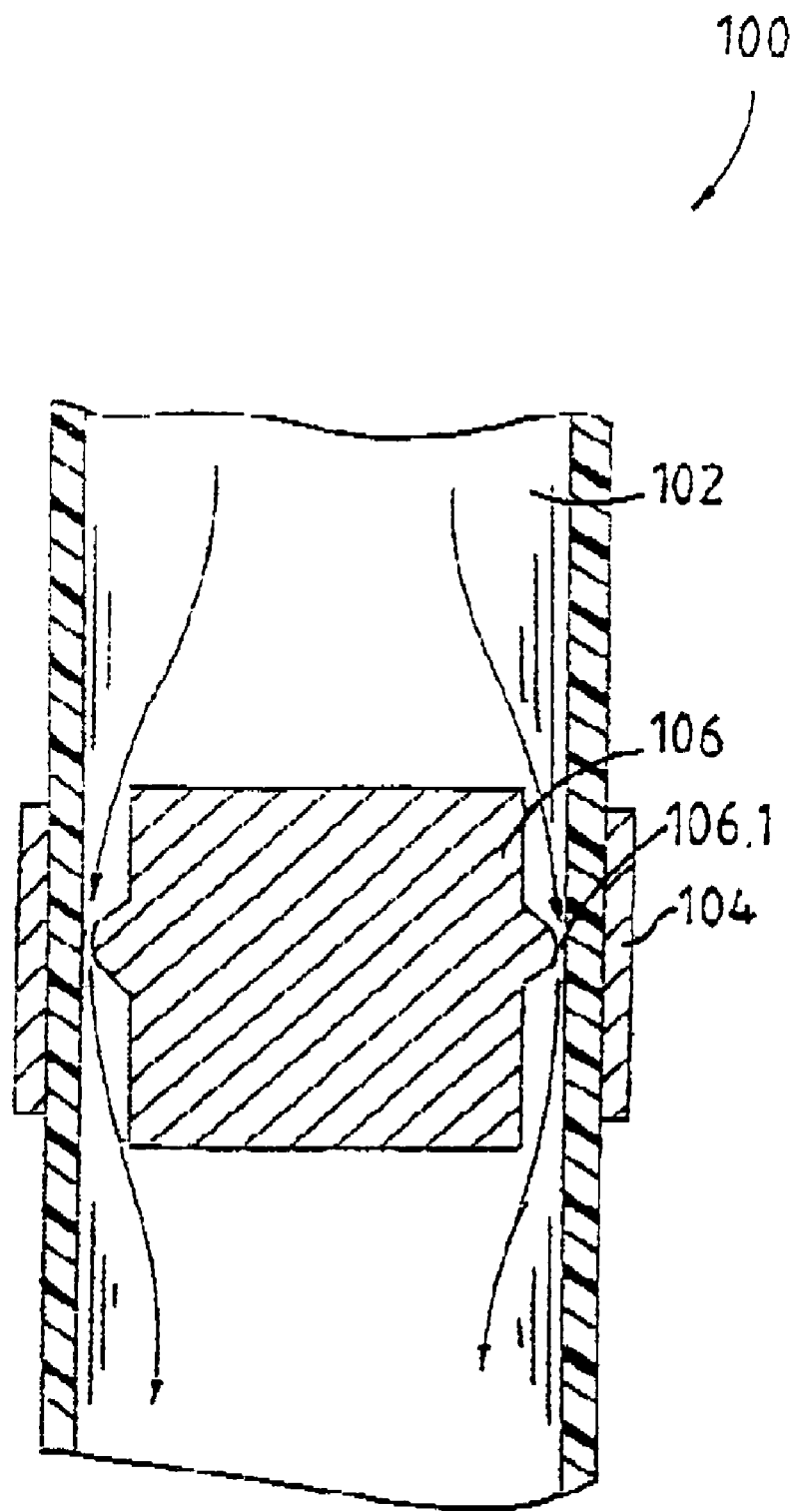
FIG. 9 is a cross-sectional side view of a central portion of the apparatus of FIG. 8.

Referring to FIGS. 8 and 9, apparatus according to a second embodiment of the invention for producing ozone is generally designated by reference numeral 100.

The basic working of the apparatus 100 is similar to that of apparatus 10, but the construction of apparatus 100 differs in that the housing 102 is manufactured from an insulating material. The apparatus 100 includes a first electrode 104, which comprises a conductive annulus extending around the housing 102 and a second electrode 106 disposed inside the housing 102.

The second electrode 106 is provided with an annular ridge formation 106.1 disposed in close proximity to the inner wall of the housing 102, in the region of the first electrode 104. The first electrode 104 is connected to the self-oscillating circuit and the second electrode 106 is earthed. A corona discharge is therefore established between the ridge formation 106.1 and the inner wall of the housing 102, causing the production of ozone as hereinbefore described.

It will be appreciated that there are many variations in detail on the method and apparatus according to the invention without departing from the scope and spirit of the appended claims.

What is claimed is:

1. A method of producing ozone comprising the steps of:
passing a gas comprising oxygen through an electrode region;
generating intermittent busts of corona discharge in the electrode region by energizing an electrode in the region with intermittent voltage pulses sufficient to cause an electric field in the electrode region to change at a rate faster than 10 kV/mm/10 ns.

2. A method as claimed in claim 1 comprising energizing the electrodes with voltage pulses having pulse widths of less than 100 ns.

3. Apparatus for producing ozone comprising:
a housing defining a passage for a fluid comprising oxygen;
first and second electrodes disposed adjacent the passage; and
a voltage pulse generating circuit for generating a switched voltage which is applied to the electrodes to energize the electrodes;
wherein the voltage pulse generating circuit comprises a field effect transistor (FET) connected to an output circuit which is connected to the electrodes and a switch circuit for the FET, the switch circuit comprising a charge storage device and a switching device, the switching device switch circuit being connected to a gate of the FET.

4. Apparatus as claimed in claim 3 wherein the voltage pulse generating circuit comprises a self-oscillating circuit.

5. Apparatus as claimed in claim 4 wherein the self-oscillating circuit comprises a field effect transistor (FET) have an output circuit which is connected to the first and second electrodes and a switch circuit for the FET, the switch circuit comprising a change storage device and a switching device connected between the charge storage device and a gate of the FET, the switching device being operative to deposit charge from the charge storage device onto the gate, thereby to improve a rise time of a voltage in said output circuit of the FET.

6. Apparatus as claimed in claim 3 wherein the charge storage device comprises a capacitor and the switching device comprises a SIDAC.

7. Apparatus as claimed in claim 3 further comprising a transformer having a primary winding and a secondary winding, wherein the electrodes are connected to the secondary winding and the primary winding is connected to the output circuit of the FET.

8. Apparatus as claimed in claim 3 wherein the passage extends between an inlet to the housing an outlet therefrom.

9. Apparatus as claimed in claim 3 wherein the first electrode is an annular electrode disposed in the housing and wherein the passage extends between the first electrode and the housing.

10. Apparatus as claimed in claim 9 wherein the housing is a metal housing serving as the second electrode and wherein an insulating layer for the first electrode is disposed between the first electrode and the housing.

11. An apparatus as claimed in claim 3 wherein the housing comprises an inner wall and is of an electricity insulating material, wherein the first electrode is disposed circumferentially outside the housing and wherein the second electrode is disposed within an inner wall of the housing, and wherein the passage is disposed between the second electrode and the inner wall.

12. The apparatus of claim 3 wherein the switching device is connected between the gate of the FET and the charge storage device, the switching device being operative to deposit charge from the charge storage device onto the gate of the FET.

13. The apparatus of claim 3 wherein the voltage pulse generating circuit generates voltage pulses between the electrodes sufficient to cause an electric field between the electrodes to change at a rate faster than 10 kV/mm/10 ns.

14. Apparatus as claimed in claim 13 wherein each voltage pulse has a pulse width of less than 100 ns.

15. The apparatus of claim 3 wherein the switching device is connected to a gate of the FET.

* * * * *